April 14, 1959     N. LEE     2,881,793
FLOW CONTROL VALVES AND APPARATUS EMBODYING SUCH VALVES
Filed Dec. 20, 1955
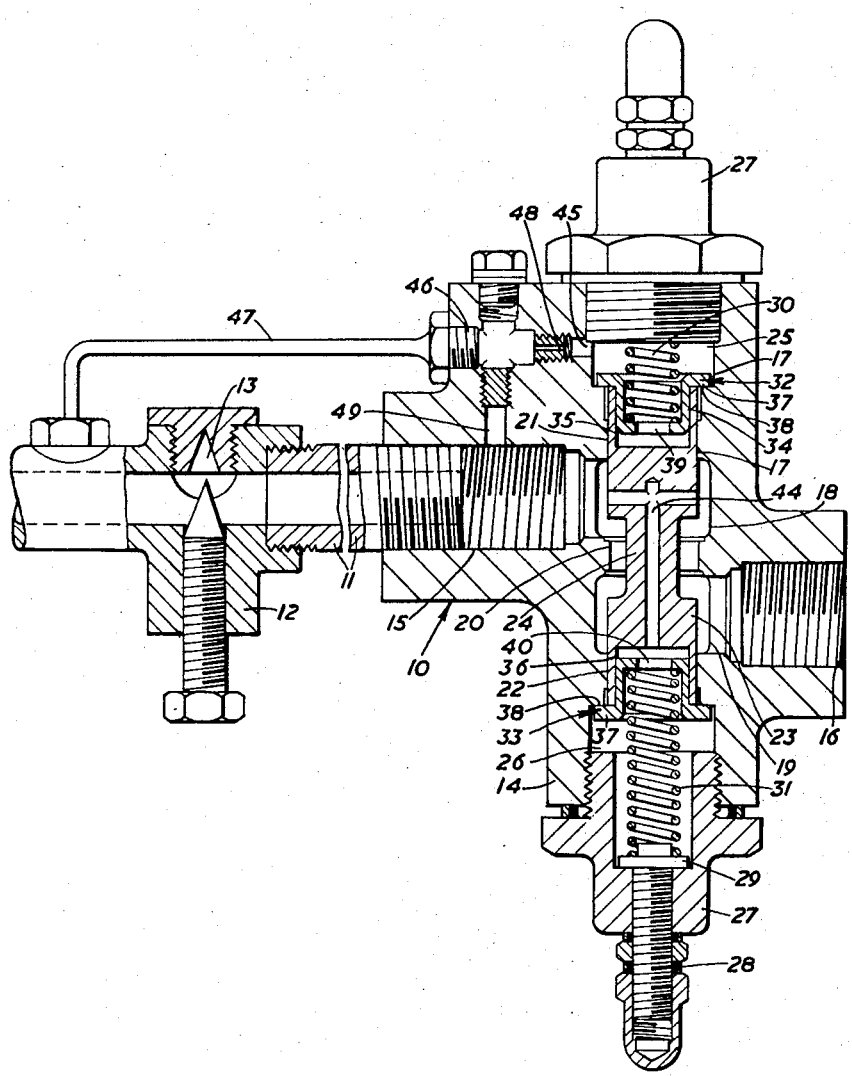
INVENTOR
NORMAN LEE
BY Watson, Cole, Grindle &
Watson ATTORNEY

United States Patent Office

2,881,793
Patented Apr. 14, 1959

2,881,793

FLOW CONTROL VALVES AND APPARATUS EMBODYING SUCH VALVES

Norman Lee, Coundon, Coventry, England, assignor to The Keelavite Company Limited, Allesley, Coventry, England, a company of Great Britain Application December 20, 1955, Serial No. 554,293

Claims priority, application Great Britain December 22, 1954

3 Claims. (Cl. 137—501)

This invention relates to apparatus for controlling the rate of flow of fluid through a passageway, referred to herein as the main passageway comprising a metering orifice and a valve arranged in series in the main passageway. It is an object of the present invention to provide a form of apparatus which will be capable of maintaining a desired rate of flow when the fluid is flowing through it in either direction.

According to the present invention apparatus for controlling the rate of flow of fluid through a main passageway comprises a metering orifice and a valve arranged in series in the main passageway, the valve having two positions in each of which it prevents or restricts flow and an intermediate position in which it permits comparatively free flow, spring means tending to centre the valve to the said intermediate position, and pressure responsive means subject to the pressures respectively on opposite sides of the orifice and arranged to exert on the valve a resultant force corresponding to the difference of those pressures, in one direction if the flow through the orifice is in one direction and in the other direction if the flow is in the opposite direction.

The valve may comprise a plunger which has two end positions in each of which it restricts flow and an intermediate position in which it permits comparatively free flow, and which affords opposed piston surfaces, spring means tending to centre the plunger to the said intermediate position, and means for admitting to the said piston surfaces fluid at the pressures respectively of opposite sides of the orifice to exert on the valve a resultant force corresponding to the difference of those pressures, in one direction if the flow through the orifice is in one direction and in the other direction if the flow is in the opposite direction.

The piston valve may afford a pair of flow chambers in series with the main passageway, a pair of pressure chambers, and a plunger having a part shaped to restrict flow between one flow chamber and the other in either of two end positions whilst allowing comparatively free flow between them in an intermediate position, and affording opposed piston surfaces exposed respectively in the two pressure chambers, spring means tending to centre the plunger to the said intermediate position, and means placing the two pressure chambers respectively in communication with the main passageway on opposite sides of the metering orifice, to exert on the plunger a resultant force corresponding to the difference of those pressures, in one direction if the flow through the orifice is in one direction and in the other direction if the flow is in the opposite direction. In this case one pressure chamber may communicate with the main passageway on the side of the metering orifice nearer to the valve through a passage formed in the plunger.

The intermediate part of the piston valve plunger preferably has a portion of reduced cross-section and passes through the two flow chambers which communicate with each other through a flow port of such size as to allow flow from one flow chamber to the other when the reduced portion is in the port but to prevent it when either end portion is in it. The port may be of circular section so as to be closed by either of two cylindrical end portions of the plunger and the reduced portion of the plunger may be of circular section so as to leave an annular flow path through the port.

The spring means conveniently comprises two separate springs acting on the valve in opposite directions and stop means limiting the travel of each spring so that it cannot move the valve beyond its intermediate position. Preferably each spring is separately adjustable.

The invention may be carried into practice in a number of ways but one specific embodiment will now be described by way of example with reference to the accompanying drawing which is a section through a flow control apparatus embodying a flow control valve and a metering orifice.

The apparatus comprises a main passageway in which a flow control valve 10 is connected by a pipe 11 in series with a needle valve 12 providing a variable metering orifice 13. The flow control valve 10 comprises a housing 14 having two transverse inlet/outlet passages 15 and 16 the former of which is connected to the pipe 11. A longitudinal bore 17 extends throughout the length of the valve housing. At the points where the inlet/outlet passages 15 and 16 open into the bore it is of slightly larger diameter to afford flow chambers 18 and 19 which are interconnected by a port 20 of a diameter equal to the normal diameter of the bore. Beyond the flow chambers 18 and 19 the bore affords bearing surfaces 21 and 22 in which a cylindrical, piston-type valve plunger 23 is mounted to slide longitudinally. The piston has a central portion 24 of reduced diameter which extends through the port 20 leaving an annular flow path round it through which fluid can pass freely from one flow chamber to the other so long as the plunger is in a central position. If the plunger moves in either direction the flow will be restricted and finally cut off by one or other of the end portions of the plunger entering and closing the port 20.

Beyond the piston-bearing surfaces 21 and 22 the bore widens out again at each end to form pressure chambers 25 and 26. These chambers are closed by end caps 27 threaded into the housing at the end of the bore. Within each end cap 27 is mounted an adjustable bolt 28 which afford a seating 29 for the outer end of a compression spring 30 or 31 mounted within the pressure chamber 25 or 26. The inner ends of each spring is received in a cup-shaped member 32 or 33 having a cylindrical portion 34 arranged to slide within a recess 35 or 36 in the adjacent end of the piston 23. The cup-members 32 and 33 have out-turned flanged edges 37 adapted to engage shoulders or stops 38 formed by the junction of the bearing surfaces 21 and 22 with the widened pressure chambers 25 and 26. In this way the extent to which the cup-members can move under the influence of the compression springs is limited, and is arranged so that when each cup-member is adjacent its stop, the reduced diameter portion 24 of the piston is in a central position within the valve. The inner transverse faces of the cup-members have holes 39 and 40 passing through them to place the pressure chambers 25 and 26 in communication with their respective ends of the piston.

A T shaped pressure passage 44 is provided in the piston to place the flow chamber 18 in direct communication with the pressure chamber 26. The other pressure chamber 25 has, branching off it, a short passage 45 leading to a pipe connection 46 connected by means of a subsidiary pipe 47 to the side of the needle valve 12 remote from the flow control valve. A constricting plug 48 is included in the passage 45 in order to damp the movement of the valve.

The manner in which the valve maintains a steady volumetric flow despite pressure fluctuations will now be described. Assuming that a steady flow of fluid is moving through the main passageway from left to right in the drawing, i.e. is flowing from the metering orifice to the flow control valve, the metering orifice will have a constant pressure drop across it so long as the input pressure is constant. If the input pressure increases, this will tend to speed up the flow. The input pressure, however, is transmitted via the subsidiary pipe 47 to the pressure chamber 25 where it will act on the top face of the piston valve plunger and tend to bias it downwards. The lower end of the piston engages the lower cup-member 33 and its movement is accordingly opposed by the lower compression spring 31.

The smaller pressure within the inlet pipe 11 will be transmitted to the fluid within the inlet flow chamber 18 and accordingly to the lower pressure chamber 26 via the T pressure passage 44. This pressure therefore acts upwards on the lower face of the piston valve plunger 23 and partially balances the downward bias due to the fluid pressure at its other end. The resultant force due to the difference of pressure across the orifice moves the valve member an appropriate amount downwards against the bias of the lower compression spring 31 and so restricts flow through the port 20, tending to reduce the flow through the main passageway, until equilibrium is reached. Accordingly the arrangement tends to minimise fluctuations in the rate of flow.

In accordance with the present invention the apparatus functions in the same manner if the flow is in the opposite direction i.e. to the left in the drawing. In this case the fluid is flowing first through the valve and then through the metering orifice, and the higher pressure will be transmitted to the lower end of the plunger. Accordingly if the flow increases the upward force on the piston will increase and will move it upwards against the bias of the upper compression spring 30 causing the lower end of the plunger to restrict the port 20 and reduce the rate of flow.

It will thus be seen that whether the direction of flow through the main passageway, in which the flow control valve and the metering orifice lie in series, is in one direction or the other, any change in the rate of flow, and hence the pressure drop across the metering orifice, produces a movement of the valve plunger in a direction tending to restore the rate of flow to its original value.

The strength of the springs 30 and 31 and their adjustment by means of the threaded bolts 28, may be chosen so that the pressure drop maintained across the metering orifice 13 and hence the volumetric rate of flow of fluid through the orifice for one direction of flow is the same or different for the two directions of flow.

It will be appreciated that in the arrangement shown in the drawing the rates of flow in both directions can be simultaneously altered at will by the adjustment of the variable needle valve 12. If the rates of flow in opposite directions were the same before such adjustment they will remain the same afterwards, otherwise they will remain in the same proportion.

What I claim as my invention and desire to secure by Letters Patent is:

1. Apparatus for controlling the rate of flow of fluid through a main passageway, comprising a metering orifice and a piston valve arranged in series in the main passageway, the valve affording a pair of relatively aligned flow chambers in series with the main passageway and a port between said flow chambers, a pair of pressure chambers, a plunger disposed for reciprocation through said port and having enlarged ends to restrict flow between one flow chamber and the other in either of two end positions whilst allowing comparatively free flow between them in an intermediate position, said enlarged ends being slidably disposed in said respective pressure chambers and affording opposed piston surfaces exposed respectively to the pressures in the two pressure chambers, spring means tending to centre the plunger to the said intermediate position, and means placing the two pressure chambers respectively in communication with the main passageway on opposite sides of the metering orifice to supply different fluid pressures to the respective chambers acting on said piston surfaces to exert on the plunger a resultant force corresponding to the difference of those pressures, in one direction if the flow through the orifice is in one direction and in the other direction if the flow is in the opposite direction.

2. Apparatus as claimed in claim 1 in which one pressure chamber communicates with the main passageway on the side of the metering orifice nearer to the valve through a passage formed in the plunger.

3. A flow control valve or apparatus as claimed in claim 1 in which said spring means includes separate springs acting against opposite ends of said plunger, and means for separately adjusting the respective springs to exert different pressures against the ends of the plunger, whereby the relationship between the movement of the plunger and the difference between the pressures acting respectively on its two ends for movement of the plunger in one direction from its intermediate position is different from the relationship between these two values for movement of the valve in the opposite direction from its intermediate position.

References Cited in the file of this patent
UNITED STATES PATENTS

| 959,397 | Simmons | May 24, 1910 |
| 1,294,151 | Page | Feb. 11, 1919 |
| 2,059,808 | Robart | Nov. 3, 1936 |
| 2,279,571 | Kane | Apr. 14, 1942 |

FOREIGN PATENTS

| 841,269 | France | Feb. 1, 1939 |
| 746,386 | Germany | July 29, 1944 |